D. VAUGHAN.
Millstone Dressing Machine.
No. 230,725. Patented Aug. 3, 1880.
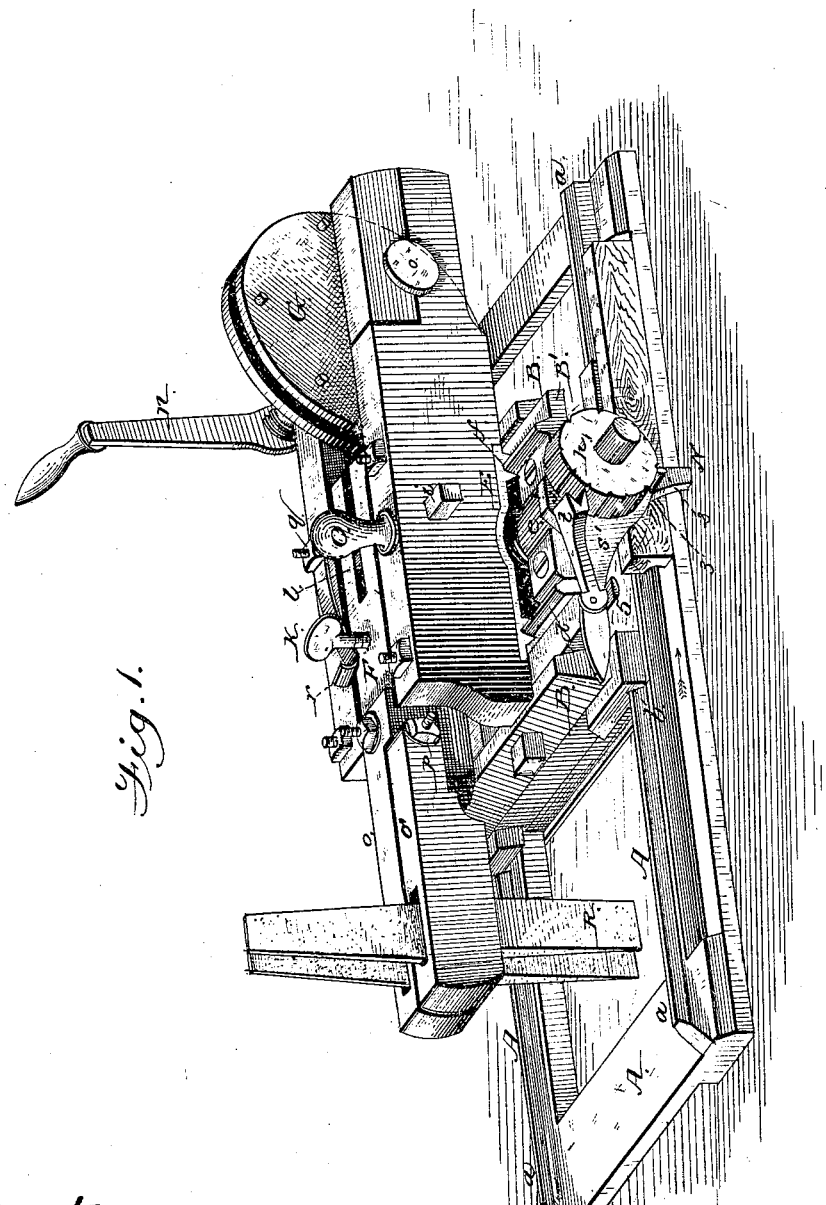

2 Sheets—Sheet 2.
D. VAUGHAN.
Millstone Dressing Machine.
No. 230,725. Patented Aug. 3, 1880.
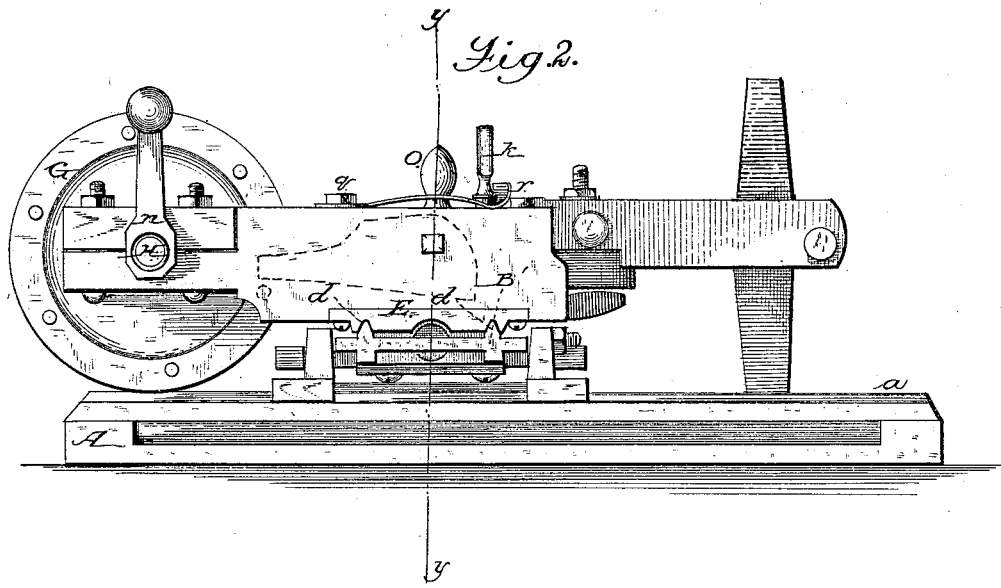
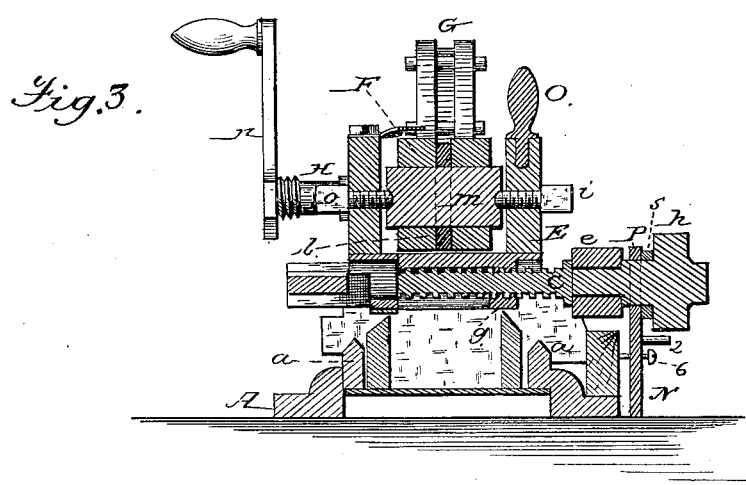

UNITED STATES PATENT OFFICE.

DAVID VAUGHAN, OF BANGOR, WISCONSIN.

MILLSTONE-DRESSING MACHINE.

SPECIFICATION forming part of Letters Patent No. 230,725, dated August 3, 1880.

Application filed February 14, 1880.

*To all whom it may concern:*

Be it known that I, DAVID VAUGHAN, of Bangor, La Crosse county, Wisconsin, have invented certain new and useful Improvements in Millstone-Dressing Machines; and I hereby declare the following to be a full, clear, and exact description thereof, reference being had to the accompanying drawings, making part of this specification, in which—

Figure 1 is a perspective view of my machine. Fig. 2 is a side elevation of the same. Fig. 3 is a vertical cross-sectional view on line $y\,y$ of Fig. 2.

The object of my invention is to provide a machine for the rapid and economical dressing of millstones by means of mill-picks; and it consists in certain combinations and arrangements of devices, as hereinafter more fully described and claimed.

In order that those skilled in the art may make and use my invention, I will proceed to describe the exact manner in which I have carried it out.

In the said drawings, A is a metallic frame to lie upon the face of the stone and provided with rails or ways $a\,a$, upon which slides the cutting apparatus by means of grooves $b\,b$ corresponding to the rails.

A frame, B, carries in turn a frame, B′, provided with short transverse rails $d\,d$, and a bearing, $e$, for an endless screw, C, for purposes hereinafter set forth. On the transverse rails $d\,d$ slides the frame E, which carries the cutting mechanism proper. Thus it will be seen that the cutter-frame E is adjustable both longitudinally on ways $a\,a$ and transversely on ways or rails $d\,d$.

The cutter-frame is provided with grooves $f\,f$, fitting over rails $d\,d$, and with nuts $g\,g$, which fit between rails $d\,d$ and receive the screw C, which carries on its outer end a ratchet-head, $h$.

The picking-lever F is pivoted between the two sides of the frame E by means of adjustable pivots $i\,i$, and is provided with an adjusting set-screw, $k$, which limits the length of the blow delivered, and at its rear end it is bifurcated to receive a contact-pawl, $l$, pivoted on the hub $m$, said pawl extending rearwardly, so as to come in contact with the teeth of a trip-wheel, G, mounted on a crank-shaft, H, having bearings in the frame E and provided with a crank, $n$. The forward end of the picking-lever F is constructed with one rigid pick-holder, $o$, and another pick-holder, $o'$, pivoted at $p$ to the picking-lever for the purpose of adjusting it in relation to the rigid pick-holder.

A curved spring, $r$, has one end fastened to the frame at $q$, and the loose end bearing down on the top of the picking-bar, so as to deliver a percussive blow when the picking-lever descends.

In order to provide an automatic transverse feed to the picking-frame it is necessary to automatically turn the screw C, and this I accomplish as follows: Inside of the ratchet-wheel $h$ and around the screw-shaft C is a yoke, $s$, to which is attached a lever, $s'$, carrying a weighted pawl, $t$, which gravity keeps always in contact with the ratchet-wheel, and between the yoke $s$ and the lower portion of the frame E is another yoke, P, around the screw-shaft, carrying a pawl-lever, N, which gravity keeps pendent, as seen in Fig. 1, and a projecting pin, 2, which passes across the edge of yoke $s$, said edge being provided with an eccentric offset, 3, which strikes said pin 2 and turns lever N, and with it throws forward pawl $t$, turning ratchet-wheel $h$ and screw C when lever N is moved, as hereinafter described. In its normal condition lever $s'$ lies against a stop, 5, projecting from frame E.

The rail below the ratchet-wheel has projecting from its side a stop-pin, 6, and as the cutter-frame is moved along the ways $a\,a$ in the direction indicated by the arrow, the pawl-lever N strikes pin 6, which moves it until the pin 2, which it carries, engages with the eccentric offset 3, which forces up lever $s'$ and throws forward pawl $t$, which catches in one of teeth of ratchet-wheel $h$, and partially turns the screw. The pawl-lever N then passes over the stop-pin, while the cutter-frame runs to the limit of its travel, and the cutter-frame again moves forward, the pawl-lever rides over pin 6, when it drops, and is ready to feed again when the frame is drawn back. At the moment the pawl feeds forward to the extent of its limit, gravity carries lever $s'$ down against stop 5.

I use ordinary picks R, which fit into heads in the picking-bar.

To operate the mechanism, place it in the proper position on the millstone, so as to range in line with the land. Then set the right-hand pick on the outer edge of the land, (if the land is one and one-half inch wide, the left-hand pick will be in the middle.) Then place the left hand on the knob O, on the top of the machine and the right hand on the crank. Draw the movable part of the machine so that the picks will be on the outer edge of the stone, turn the crank with the right hand, and move with the left hand the counter-section of the machine forward, meantime rapidly turning the crank, so that the picks will strike the stone rapidly. Dwell longer on the darker spots left by the red-staff, and pass over the light spots faster. After cutting the first two creases from the edge of the stone toward the eye, draw the counter-section back to the edge of the stone. This act of drawing back will set the picker-lever over by means of the lever N striking the pin 6 and turning screw C.

Having thus described my invention, I claim as new and desire to secure by Letters Patent—

The picker-lever F, provided with the pick-holder o, in combination with the adjustable pick-holding section o', pivoted at p, substantially as described, and for the purpose set forth.

DAVID VAUGHAN.

Witnesses:
D. D. JONES,
S. B. WHELDON.